United States Patent
Hipsky et al.

(10) Patent No.: US 8,904,805 B2
(45) Date of Patent: Dec. 9, 2014

(54) ENVIRONMENTAL CONTROL SYSTEM FOR AIRCRAFT UTILIZING TURBO-COMPRESSOR

(75) Inventors: Harold W. Hipsky, Willington, CT (US); Gabriel L. Suciu, Glastonbury, CT (US); Christopher M. Dye, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 551 days.

(21) Appl. No.: 13/345,793

(22) Filed: Jan. 9, 2012

(65) Prior Publication Data

US 2013/0174573 A1   Jul. 11, 2013

(51) Int. Cl.
*F02C 6/04* (2006.01)

(52) U.S. Cl.
USPC ............... 60/785; 60/782; 60/795; 60/39.83; 244/57; 244/58

(58) Field of Classification Search
USPC ............... 60/782, 785, 795, 39.83, 805, 806, 60/39.15, 784; 244/57, 58
See application file for complete search history.

(56) References Cited

U.S. PATENT DOCUMENTS

| | | | |
|---|---|---|---|
| 2,871,671 A * | 2/1959 | Bartlett, Jr. et al. | 62/172 |
| 4,285,466 A | 8/1981 | Linscheid et al. | |
| 6,412,270 B1 * | 7/2002 | Mortzheim et al. | 60/782 |
| 6,647,730 B2 | 11/2003 | Liu | |
| 6,684,660 B1 | 2/2004 | Bruno et al. | |
| 7,171,819 B2 | 2/2007 | Lui et al. | |
| 7,305,842 B1 | 12/2007 | Schiff | |
| 7,785,066 B2 * | 8/2010 | Bil et al. | 415/145 |
| 8,276,392 B2 * | 10/2012 | Van Der Woude | 60/785 |

\* cited by examiner

*Primary Examiner* — Craig Kim

(74) *Attorney, Agent, or Firm* — Carlson, Gaskey & Olds, PC

(57) ABSTRACT

An environmental control system includes a higher pressure tap to be associated with a higher compression location in a main compressor section associated with a gas turbine engine. A lower pressure tap is associated with a lower pressure location, which is at a lower pressure than the higher pressure location. The lower pressure tap communicates to a first passage leading to a downstream outlet and a second passage leading into a compressor section of a turbocompressor. The higher pressure tap leads into the turbine section of the turbocompressor such that air in the higher pressure tap drives the turbine section to in turn drive the compressor section of the turbocompressor. A combined outlet of the compressor section of the turbocompressor and the turbine section intermix and pass downstream to be delivered to an aircraft use.

13 Claims, 2 Drawing Sheets

ENVIRONMENTAL CONTROL SYSTEM FOR AIRCRAFT UTILIZING TURBO-COMPRESSOR

BACKGROUND OF THE INVENTION

This application relates to an environmental control system for an aircraft which taps both high and low pressure compressed air for uses on an aircraft.

Environmental control systems are known, and associated with an aircraft. Typically, these systems tap air from a gas turbine engine on the aircraft, and send it to the aircraft cabin, and other air uses on the aircraft.

The systems typically tap a low pressure compressed air from a lower pressure compressor location, and a higher pressure compressed air from a higher pressure compressor location. The two are utilized at distinct times during the operation of a gas turbine engine, dependent on the needs, and the available air.

In the prior art, when the higher pressure air is tapped, it is at a very high temperature. Thus, cooling of the air must occur. It is typical that some form of intercooler or other heat exchanger is included.

In addition, the higher pressure compressed air has already been compressed beyond the level of the lower pressure compressed air. The more higher pressure compressed air that is diverted away from engine uses, the lower the efficiency of the engine.

SUMMARY OF THE INVENTION

An embodiment addresses an environmental control system for an aircraft which includes a higher pressure tap to be associated with a higher compression location in a main compressor section associated with an aircraft. A lower pressure tap is associated with a lower pressure location, which is at a lower pressure than the higher pressure location. The lower pressure tap communicates to a first passage leading to a downstream outlet, and has a second passage leading into a compressor section of a turbocompressor. The higher pressure tap leads into a turbine section of the turbocompressor such that air in the higher pressure tap drives the turbine section to in turn drive the compressor section of the turbocompressor. A combined outlet of the compressor section of the turbocompressor and the turbine section intermix and pass downstream to be delivered to an aircraft use.

In another embodiment, a valve is on the first passage associated with the lower pressure tap.

In another embodiment according to the foregoing embodiment, the valve is a check valve.

In yet another embodiment, a control valve is positioned on the higher pressure tap, and may be closed to drive air through the first passage associated with said lower pressure tap, or to have air pass through the compressor section of the turbocompressor when the control valve is opened.

In another embodiment according to the foregoing embodiment, a redundant valve is provided to be closed if the control valve associated with the higher pressure tap fails.

In another embodiment according to the foregoing embodiment, the redundant valve is positioned to be downstream of a location at which the first passage and the combined outlet intermix into a common conduit.

Another featured embodiment provides a gas turbine engine having a fan section delivering air into a main compressor section. The main compressor section comprises air and delivers it into a combustion section. Products of combustion pass from the combustion section over turbine sections to drive the fan and main compressor sections. An environmental control system includes a higher pressure tap at a higher compression location in a main compressor section. A lower pressure tap is at a lower pressure location, which is at a lower pressure than the higher pressure location. The lower pressure tap communicates to a first passage leading to a downstream outlet, and has a second passage leading into a compressor section of a turbocompressor. The higher pressure tap leads into a turbine section of the turbocompressor such that air in the higher pressure tap drives the turbine section to in turn drive the compressor section of the turbocompressor. A combined outlet of the compressor section of the turbocompressor and the turbine section intermix and pass downstream to be delivered to an aircraft use.

In another embodiment, a valve is on the first passage associated with the lower pressure tap.

In another embodiment according to the foregoing embodiment, the valve is a check valve.

In yet another embodiment, a control valve is positioned on the higher pressure tap, and may be closed to drive air through the first passage associated with said lower pressure tap, or to have air pass through the compressor section of the turbocompressor when the control valve is opened.

In another embodiment according to the foregoing embodiment, a redundant valve is provided to be closed if the control valve associated with the higher pressure tap fails.

In another embodiment according to the foregoing embodiment, the redundant valve is positioned to be downstream of a location at which the first passage and the combined outlet intermix into a common conduit.

Another featured embodiment includes a higher pressure tap associated with a higher compression location in a main compressor section associated with an aircraft. A lower pressure tap is associated with a lower pressure location, which is at a lower pressure than the higher pressure location. The lower pressure tap communicates to a first passage leading to a downstream outlet, and has a second passage leading into a compressor section of a turbocompressor. The higher pressure tap leads into a turbine section of the turbocompressor such that air in the higher pressure tap drives the turbine section to in turn drive the compressor section of the turbocompressor. A combined outlet of the compressor section of the turbocompressor and the turbine section intermix and pass downstream to be delivered to an aircraft use. A check valve on the first passage is associated with the lower pressure tap. A control valve is positioned on the higher pressure tap and may be closed to drive air through the first passage associated with the lower pressure tap, or to have air pass through the compressor section of the turbocompressor when the control valve is opened. A redundant valve is provided to be closed if the control valve associated with the higher pressure tap fails. The redundant valve is positioned to be downstream of a location at which the first passage and the combined outlet intermix into a common conduit.

These and other features of the invention would be better understood from the following specifications and drawings, the following of which is a brief description.

DETAILED DESCRIPTION

Figure 1:
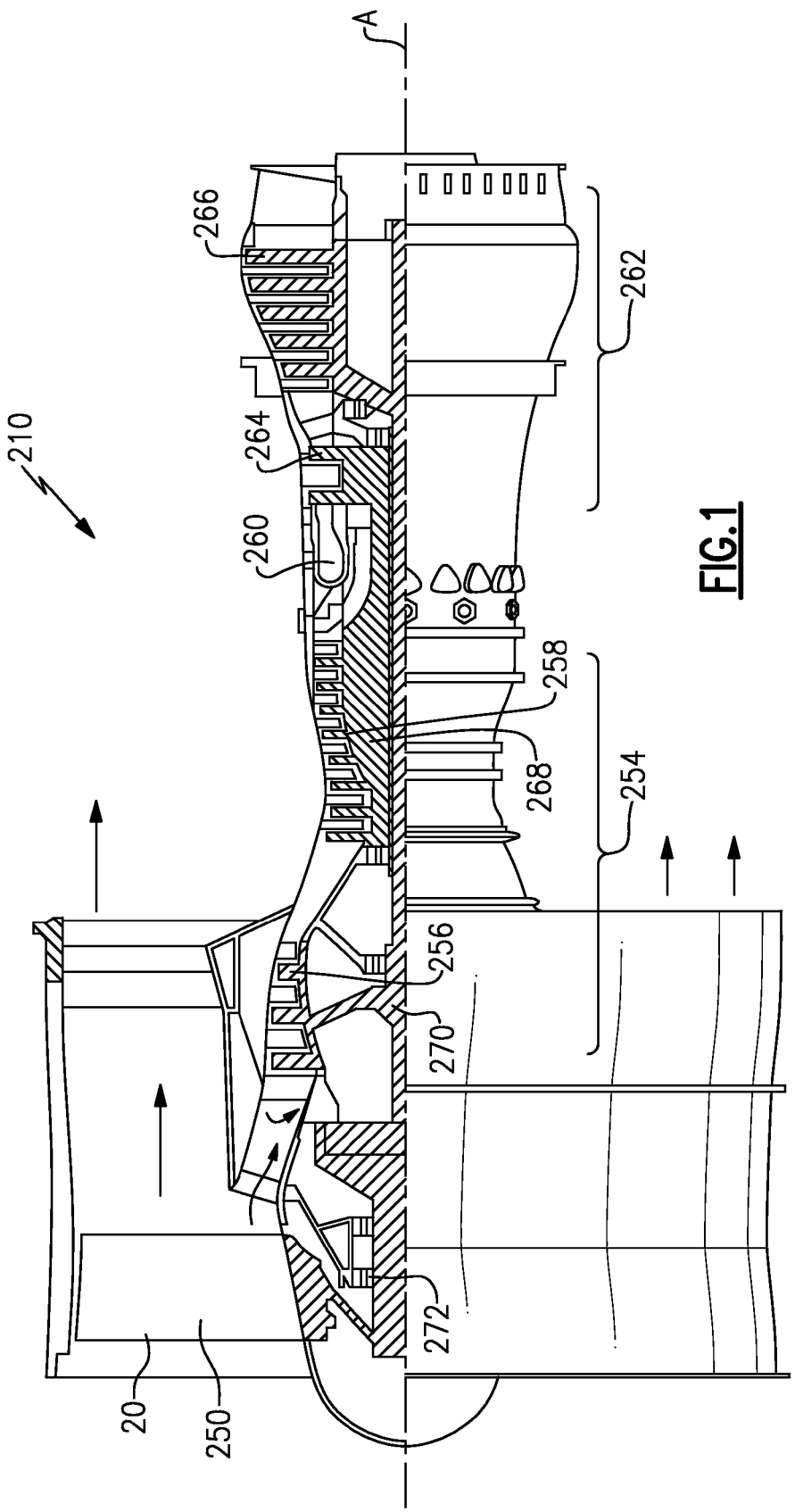
FIG. 1 schematically shows a gas turbine engine.

A gas turbine engine 210 is shown in FIG. 1. As shown, the engine 210 includes a fan 250 (which includes a plurality of fan blades 20), a compressor section 254 (which includes both a low pressure compressor 256 and a high pressure compressor 258), a combustor 260, and a turbine section 262 (which includes both a high pressure turbine 264 and a low pressure turbine 266). The high pressure compressor 258 is driven, via a first spool 268, by the high pressure turbine 264. The low pressure compressor 256 is driven, via a second spool 270, by the low pressure turbine 266. Also driven by the low pressure turbine 266 are the fan blades 20 of the fan 250, which fan is coupled to the second spool 270 via a gear 272.

Figure 2:
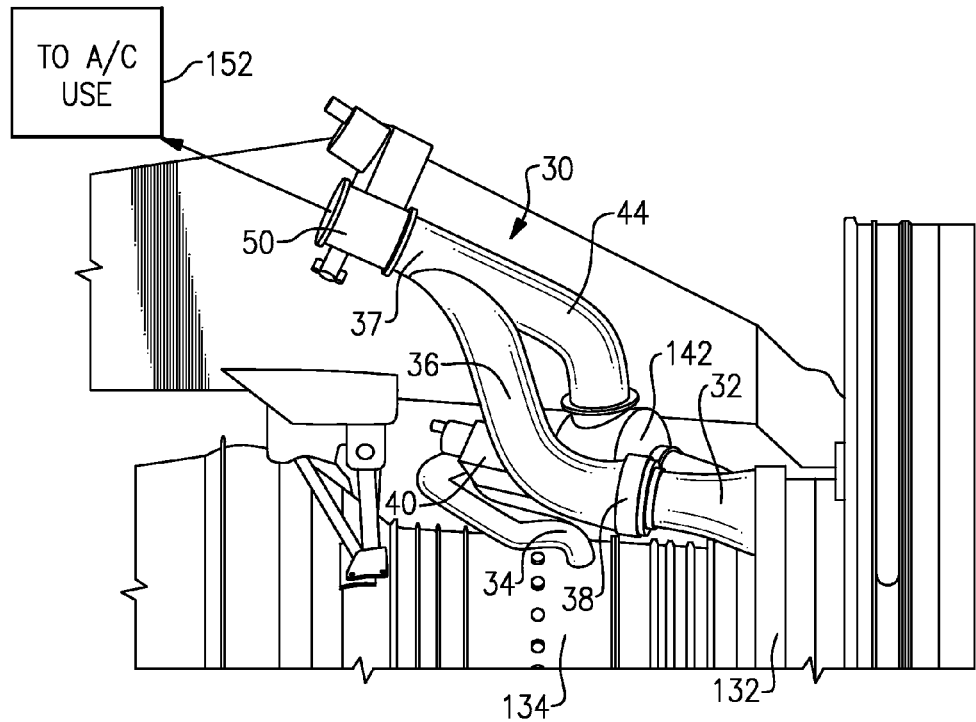
FIG. 2 shows an environmental control system for an aircraft.

An environmental control system 30 for use on an aircraft is illustrated in FIG. 2. A high pressure compression location 134 has a tap 34 as shown in FIG. 2. Another tap 32 is at a lower pressure location 132. Locations 132 and 134 may both be within the high pressure compressor 258 or one may be in the lower pressure compressor section 256. However, the tap 34 is downstream of the tap 32, and at a higher pressure location.

Figure 3:
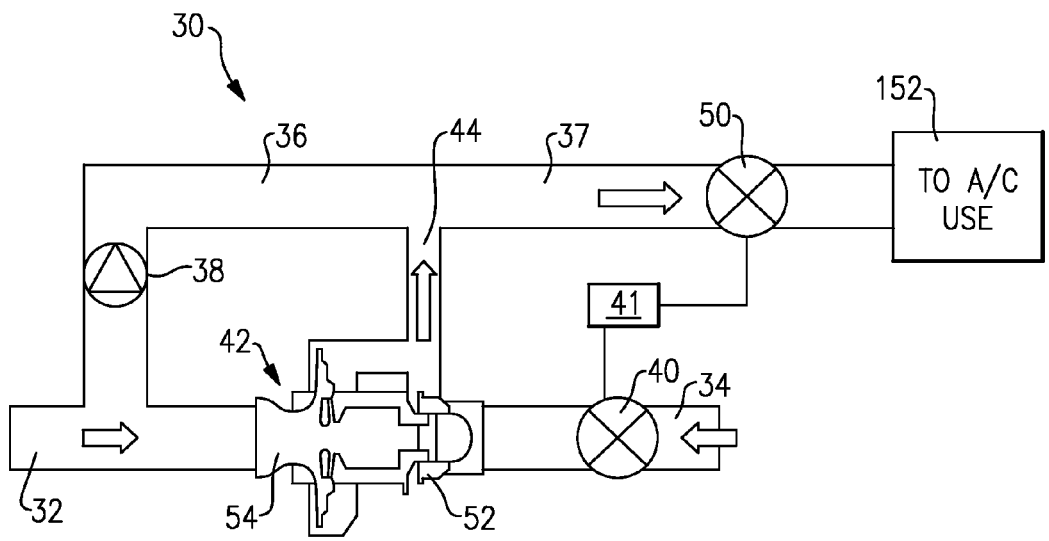
FIG. 3 shows a schematic of the FIG. 2 system.

As can be seen from FIG. 3, the tap 32 leads to one flow line 36 having a check valve 38, and also into the compressor section 54 of a turbocompressor 42. The high pressure tap 34 leads into a turbine section 52 of the turbocompressor 42. The exits of both compressor section 54 and turbine section 52 of turbocompressor 42 pass into a common outlet 44.

The outlet 44 merges with the outlet 36, and both pass through a valve 50 on line 37 leading to an aircraft use 152.

As shown in FIG. 3, the tap 32 alternatively leads to compressor section 54, or into conduit 36 leading to a combined outlet 37. Check valve 38 allows flow from tap 32 to line 36 in a single direction. It also provides some resistance to flow in that direction. The tap 34 leads through a modulating and shutoff valve 40 which can be opened or closed by a controller 41, shown schematically. Air from the higher compressed location at tap 34 is expanded across the turbine section 52 into the outlet 44. This drives the compressor section 54 to compress the air from the tap 32, and increase its pressure. The two outlets mix in conduit 44, and pass to the combined outlet 37. When the compressor section 54 is being driven by the turbine section 52, there is suction applied to the line 32, and thus check valve 38 will remain closed.

The air from the tap 32 is used generally exclusively under certain conditions when the heat to be rejected is at a maximum. As an example, the air will tend to pass from tap 32 through the check valve 38 to the line 36 during climb and cruise. At such times the valve 40 is maintained closed to limit the diversion of compressed air.

However, under certain conditions, as an example a descent, the valve 40 is opened, the turbine section 52 is driven. The air from tap 32 passes to the compressor section 54. At such times expanding the compressed air from tap 34 lowers its temperature. Further, mixing it with the lower pressure compressed air 32, even when compressed to a higher pressure by compressor section 54, may eliminate the need for a separate heat exchanger on the line 44. The intermixed air may be at a useful temperature when it reaches the combined outlet 37. The amount of air from the two taps can be varied to achieve this.

The valve 50 is a control valve which may be closed if the valve 40 fails. At such times, it may be more desirable to supply no air to the system 152, then to have an open diversion from the tap 34.

The elimination of a required heat exchanger, and the use of less air from the higher compression location, are particularly valuable when combined with a system incorporating a gear drive for the turbo fan, such as shown at 272 in FIG. 1.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An environmental control system for an aircraft comprising:
   a higher pressure tap to be associated with a higher compression location in a main compressor section associated with the aircraft, and a lower pressure tap to be associated with a lower pressure location of said main compressor section, said lower pressure location being at a lower pressure than said higher pressure location;
   said lower pressure tap communicating to a first passage leading to a downstream outlet, and having a second passage leading into a compressor section of a turbocompressor;
   said higher pressure tap leading into a turbine section of said turbocompressor such that air in said higher pressure tap drives said turbine section to in turn drive said compressor section of said turbocompressor; and
   a combined outlet of said compressor section of said turbocompressor and said turbine section intermixing and passing downstream to be delivered to an aircraft use.

2. The environmental control system as set forth in claim 1, wherein a valve is on said first passage associated with said lower pressure tap.

3. The environmental control system as set forth in claim 2, wherein said valve is a check valve.

4. The environmental control system as set forth in claim 2, wherein a control valve is positioned on said higher pressure tap, and may be closed to drive air through said first passage associated with said lower pressure tap, or to have air pass through said compressor section of said turbocompressor when said control valve is opened.

5. The environmental control system as set forth in claim 4, wherein a redundant valve is provided to be closed if said control valve associated with said higher pressure tap fails.

6. The environmental control system as set forth in claim 5, wherein said redundant valve is positioned to be downstream of a location at which said first passage and said combined outlet intermix into a common conduit.

7. A gas turbine engine comprising:
   a fan section delivering air into a main compressor section, said main compressor section compressing air and delivering air into a combustion section, products of combustion passing from said combustion section over turbine sections to drive said fan and main compressor sections; and
   an environmental control system including a higher pressure tap at a higher compression location in said main compressor section, and a lower pressure tap at a lower pressure location of said main compressor section, said lower pressure location being at a lower pressure than said higher pressure location;
   said lower pressure tap communicating to a first passage leading to a downstream outlet, and having a second passage leading into a compressor section of a turbocompressor;
   said higher pressure tap leading into a turbine section of turbocompressor such that air in said higher pressure tap drives said turbine section to in turn drive said compressor section of said turbocompressor; and
   a combined outlet of said compressor section of said turbocompressor and said turbine section intermixing and passing downstream to be delivered to an aircraft use.

8. The environmental control system as set forth in claim 7, wherein a valve is on said first passage associated with said lower pressure tap.

9. The environmental control system as set forth in claim 8, wherein said valve is a check valve.

10. The environmental control system as set forth in claim 8, wherein a control valve is positioned on said higher pressure tap, and may be closed to drive air through said first passage associated with said lower pressure tap when closed, or to have air pass through said compressor section of said turbocompressor when said control valve is opened.

11. The environmental control system as set forth in claim 10, wherein a redundant valve is provided to be closed if said control valve associated with said higher pressure tap fails.

12. The environmental control system as set forth in claim 11, wherein said redundant valve is positioned to be downstream of a location at which said first passage and said combined outlet intermix into a common conduit.

13. An environmental control system for an aircraft comprising:
- a higher pressure tap to be associated with a higher compression location in a main compressor section associated with the aircraft, and a lower pressure tap to be associated with a lower pressure location said lower pressure location of said main compressor section, being at a lower pressure than said higher pressure location;
- said lower pressure tap communicating to a first passage leading to a downstream outlet, and having a second passage leading into a compressor section of a turbocompressor;
- said higher pressure tap leading into a turbine section of said turbocompressor such that air in said higher pressure tap drives said turbine section to in turn drive said compressor section of said turbocompressor;
- a combined outlet of said compressor section of said turbocompressor and said turbine section intermixing and passing downstream to be delivered to an aircraft use;
- a check valve on said first passage associated with said lower pressure tap; a control valve positioned on said higher pressure tap may be closed to drive air through said first passage associated with said lower pressure tap, or to have air pass through said compressor section of said turbocompressor when said control valve is opened; and
- a redundant valve provided to be closed if said control valve associated with said higher pressure tap fails, said redundant valve positioned to be downstream of a location at which said first passage and said combined outlet intermix into a common conduit.

* * * * *